United States Patent [19]
Knockum

[11] Patent Number: 5,389,186
[45] Date of Patent: Feb. 14, 1995

[54] CARPET SEAM TAPE APPARATUS

[76] Inventor: Wilbert Knockum, 2614 - 99th Ave., Oakland, Calif. 94605

[21] Appl. No.: 118,955

[22] Filed: Sep. 9, 1993

[51] Int. Cl.$^6$ ............................................. B29C 65/00
[52] U.S. Cl. .................... 156/391; 156/574; 156/576; 156/577; 156/579
[58] Field of Search ............... 156/391, 574, 576, 577, 156/579, 304.4, 304.7; 242/55; 86.52

[56] References Cited

U.S. PATENT DOCUMENTS

| | | | |
|---|---|---|---|
| 3,748,211 | 7/1973 | Hoopengardner | 156/505 |
| 4,536,244 | 8/1985 | Greci et al. | 156/304.4 |
| 4,581,091 | 4/1986 | Lane | 156/304.4 |
| 4,584,040 | 4/1986 | Anderson | 156/152 |
| 4,755,254 | 7/1988 | Bedwell | 156/554 |
| 5,028,295 | 7/1991 | Cracchiolo | 156/574 |

*Primary Examiner*—David A. Simmons
*Assistant Examiner*—J. Sells
*Attorney, Agent, or Firm*—McCubbrey, Bartels & Ward

[57] ABSTRACT

A carpet seam tape apparatus for dispensing carpet seam tape below and centered with respect to juxtaposed edges of adjacent carpet sections. The carpet seam apparatus generally comprises a base guide means connected to the base adapted for mounting between upturned juxtaposed edges of adjacent carpet sections and clamping means connected to the base adapted to engage and align the carpet seam tape substantially centered between the juxtaposed edges of the adjacent carpet sections. The guide means are configured to maintain displacement of the juxtaposed edges of adjacent carpet sections when disposed therebetween at substantially less than the width of the carpet seam tape thereby effectively preserving the carpet fibers near the juxtaposed edges.

6 Claims, 2 Drawing Sheets

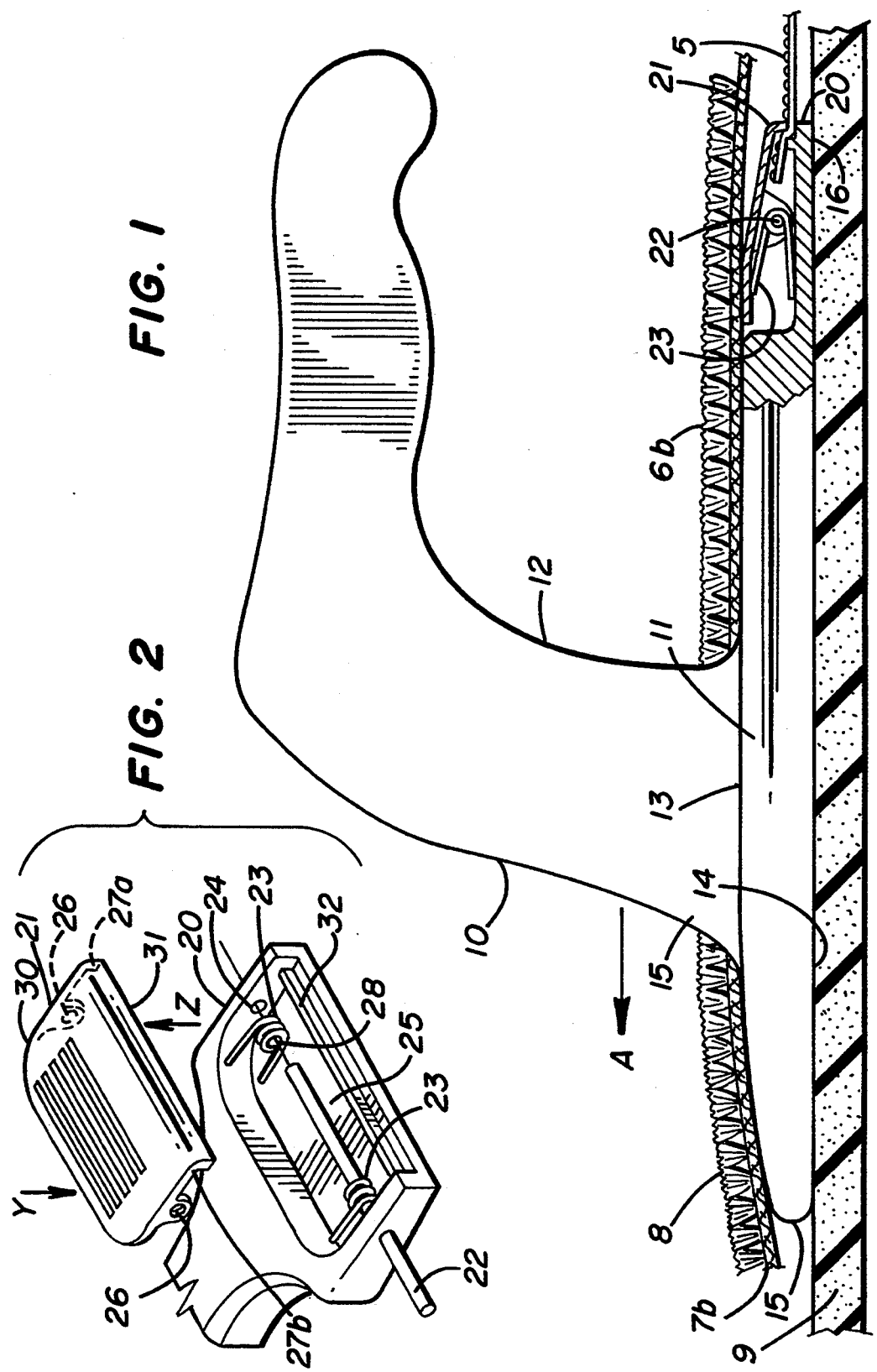

CARPET SEAM TAPE APPARATUS

FIELD OF THE INVENTION

The present invention relates generally to apparatus for laying carpet seam tape. More particularly, to a carpet seaming apparatus for centering carpet seam tape between and below juxtaposed edges of adjacent carpet sections to be joined.

BACKGROUND OF THE INVENTION

The method commonly employed in the carpet industry to secure the abutting edges forming the seam between adjacent carpet sections is to place a carpet tape under the seam and adhesively secure the tape to the underside of the carpet. The tape is generally about 4 to 6 inches in width and is commonly made from a paper base, fiberglass or rayon reinforced.

The use of such tape has eliminated older carpet laying techniques of sewing adjacent edges together, which has represented one of the most difficult and time consuming tasks in the carpet laying field. Hand placement of the tape is however difficult, requiring awkward manipulation of the carpet edges and tape.

Various carpet tape dispensers have been employed to eliminate hand placement of the tape. Illustrative are the tape dispensers disclosed in U.S. Pat. Nos. 3,748,211 and 4,581,891.

In U.S. Pat. No. 3,748,211 a box-shaped carpet seaming tape dispenser is disclosed which mounts between upturned juxtaposed edges of adjacent carpet sections which are to be joined together. The dispenser is designed to directionally release tape parallel to the juxtaposed edges and directly on the floor which the carpet is to cover.

A major drawback of the noted dispenser is the substantial displacement of the juxtaposed edges of the adjacent carpet sections which results from the dispenser being placed within and traversing through the adjacent edges while the tape is being dispensed. It has been found that such displacement of the carpet edges can, and in many instances will, damage the carpet fibers near the juxtaposed edges, particularly when the dispenser is moved therethrough.

In U.S. Pat. No. 4,581,091, a similar apparatus is disclosed which is mounted between juxtaposed edges of the adjacent carpet sections. This apparatus is also moved substantially parallel with and between the carpet edges while dispensing tape through a discharge passage. A trailing plate is also employed which is detachably connected to the tape holding container in alignment with the discharge passage so that as tape is dispensed, the tape is supported on the trailing plate under the juxtaposed edges of the carpet sections.

The noted apparatus similarly requires substantial displacement between the juxtaposed edges of the carpet sections to allow for the tape holding container and trailing plate to move between the edges of the carpet sections. Thus, a substantial portion of the carpet fibers near the juxtaposed edges are exposed to and, in many instances, damaged by the movement of the carpet tool.

It is therefore an object of the present invention to provide a carpet tape apparatus which is easily maneuvered to position carpet seam tape centrally below juxtaposed edges of adjacent carpet sections while preserving the carpet fibers near the juxtaposed edges of the adjacent carpet sections.

It is a further object of the present invention to provide a carpet tape apparatus for dispensing carpet seam tape substantially centered between juxtaposed edges of adjacent carpet sections while maintaining minimal displacement of the juxtaposed edges of the adjacent carpet section when disposed and moving therebetween.

Other objects of the invention will become apparent to those skilled in the art from the following description and accompanying drawings.

SUMMARY OF THE INVENTION

The carpet seam tape apparatus of the present invention substantially reduces or eliminates the disadvantages and shortcomings associated with prior art devices. The invention specifically discloses a carpet seam tape apparatus for dispensing carpet seam tape below and centered with respect to juxtaposed edges of adjacent carpet sections.

The carpet seam apparatus generally comprises a base having a handle extending from the top surface, guide means connected to the base adapted for mounting between upturned juxtaposed edges of adjacent carpet sections and clamping means connected to the base adapted to engage and align the carpet seam tape substantially centered between the juxtaposed edges of the adjacent carpet sections.

A key feature of the present invention is that the guide means have a configuration to maintain displacement of the juxtaposed edges of adjacent carpet sections when disposed therebetween at substantially less than the width of the carpet seam tape. Accordingly, as the carpet seam apparatus is moved between juxtaposed edges of adjacent carpet sections the apparatus will dispense carpet seam tape centrally below the juxtaposed edges of the adjacent carpet sections while preserving the carpet fibers near the juxtaposed edges of the adjacent carpet sections.

BRIEF DESCRIPTION OF THE DRAWINGS

The above and other and further objects of the present invention will become apparent, as will a better understanding of the concepts underlying the present invention by reference to the description which follows taken in conjunction with the accompanying figures, in which:

FIG. 1 is an exploded perspective view of the carpet tape dispenser and tape holder according to the invention;

FIG. 2 is a side plan view of the carpet tape dispenser according to the invention.

DETAILED DESCRIPTION OF THE PREFERRED EMBODIMENTS

Figure 3:
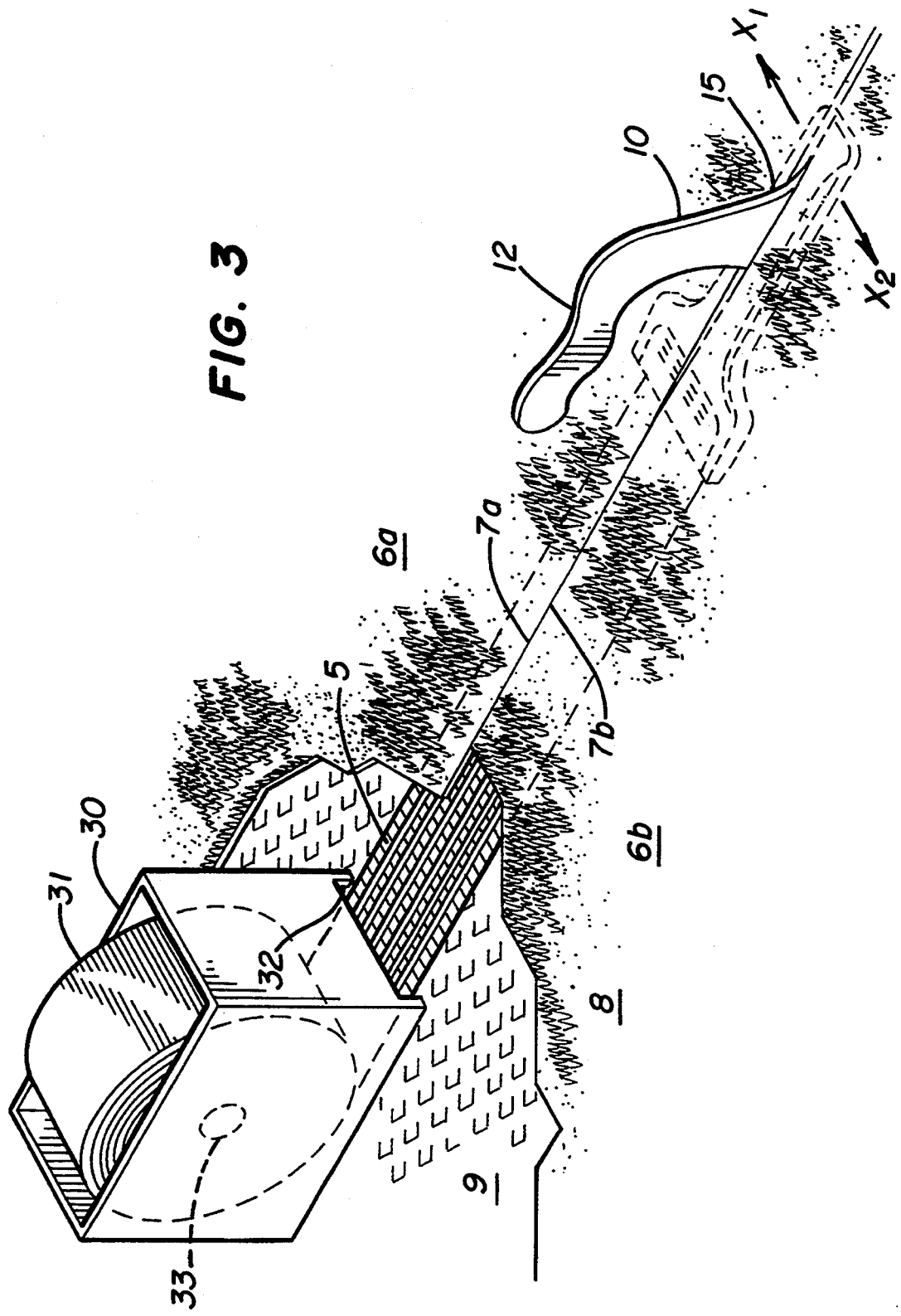
FIG. 3 is a partial perspective view of the carpet tape dispenser according to the invention illustrating the clamping means for engaging the carpet seam tape.

The carpet seam tape apparatus of the present invention is generally illustrated in FIGS. 1-3. Referring to FIG. 1, the tape dispenser 10 generally comprises a base 11, a handle 12, guide means for guiding the base 11 between and substantially parallel to the adjacent carpet sections 6a, 6b and clamping means adapted to engage and align the carpet seam tape 5 substantially centered between the juxtaposed edges 7a, 7b of the adjacent carpet sections 6a, 6b.

As illustrated in FIG. 1, the base 11 comprises a top 13 and bottom 14 surface. As will be recognized by one skilled in the art, the base 11 may comprise various configurations. However, in the preferred embodiment, the base 11 comprises a thin (i.e., <0.5 in.) substantially planar elongated member with a substantially smooth top 13 and bottom 14 surface. The base 11 may comprise various light weight materials such as cast aluminum or plastic.

Adjacent the forward end of the base 11 is a (nose portion 15.) The nose 15 is preferably defined by a tapered configuration which, when the base 11 is moved in an operative direction indicated by Arrow A in FIG. 1, the adjacent carpet sections 6a, 6b near the juxtaposed edges 7a, 7b thereof is allowed to raise up and over the base 11 with minimal displacement. The tapered nose configuration also prevents the leading edge of the dispenser 10 from catching and/or damaging the carpet 8 and/or padding 9 when the tape dispenser 10 is moved in the operative direction indicated by Arrow A.

As further illustrated in FIG. 1, the dispenser 10 also includes a handle 12 extending from the top surface 13 of the base 11. The handle 12 may be integrally constructed with the base 11 or operatively mounted thereto. In the preferred embodiment, the handle 12 is positioned centrally on the base 11 with the vertical axis aligned substantially parallel with the longitudinal axis of the tape 5.

According to the invention, the tape dispenser 10 is also provided with guide means. The guide means are connected to the dispenser base 11 and adapted for mounting between upturned juxtaposed edges 7a, 7b of the adjacent carpet sections 6a, 6b to be seamed for guiding the dispenser base 11 between and substantially parallel to the adjacent carpet sections 6a, 6b. The guide means are also configured to maintain minimal displacement of the juxtaposed edges 7a, 7b of the adjacent carpet sections 6a, 6b in directions of Arrows $X_1$ and $X_2$, respectively, when disposed therebetween (see FIG. 1). In the preferred embodiment, the horizontal displacement is maintained at substantially less than the width of the carpet seam tape. More preferably, the horizontal displacement of the juxtaposed edges 7a, 7b is generally less than 0.5 in.

As illustrated in FIGS. 1 and 3, in the preferred embodiment, the (handle base 15) comprises the guide means. In further embodiments of the invention, not shown, the handle base 15 may include recessed regions on both sides thereof to further minimize the displacement of the adjacent carpet sections 6a, 6b.

The tape dispenser 10 of the present invention further includes clamping means for engaging and securing the carpet tape 5. Referring to FIG. 2, in the preferred embodiment, the clamping means are integral with the base 11 and adapted to engage and align the carpet seam tape 5 substantially centered between the juxtaposed edges 7a, 7b of the adjacent carpet sections 6a, 6b. As illustrated in FIG. 1, the clamping means are generally disposed at the rearward portion 16 of the dispenser base 11.

The clamping means generally comprise a clamp base 20, a clamp top 21, a pin 22 and a pair of clamp springs 23 having holes 28 therein adapted to receive the clamp pin 22. The clamp base 20 includes a pair of holes 24 disposed on opposite ends thereof adapted to receive the clamp pin 22. The clamp top 21 is designed and configured to seat within tile recessed portion 25 of the clamp base 20. The clamp top 21 also includes a pair of holes 26 disposed on opposite edges 27a, 27b thereof designed and configured to rotatably engage the clamp pin 22.

To assemble the clamp means, the springs 23 are aligned and positioned in the recessed portion 25 of the clamp base 20 on opposite ends thereof. The clamp top 21 is then positioned over the springs 23 on the clamp base 20. The pin 22 is then inserted through clamp base holes 24, the spring holes 28 and clamp top holes 26 such that the clamp top 21 is rotatably secured to the clamp base 20.

To engage and secure the carpet seam tape 5, the rearward edge 30 of the clamp top 21 is depressed in the direction indicated by Arrow Y causing rotation about the clamp pin 22 and vertical displacement of the forward end 31 of the clamp top 21 in the direction indicated by Arrow Z. The tape 5 is then positioned between the edge 31 of the clamp top 21 and edge 32 of the clamp base 20. When the clamp top 21 is released, the springs 23 exert a force at edges 31, 32 retaining the tape 5 in the secured position.

Referring to FIG. 3, the present invention also includes tape holder means 30 for rotatably supporting a roll of carpet seam tape 31. The tape holder means 30 include a tape discharge passage 32 adapted to directionally dispense the carpet seam tape 5.

According to the invention, the roll of tape 31 is supported in the tape holder means 30 such that the axis of rotation is generally perpendicular to the juxtaposed edges 7a, 7b of the adjacent carpet sections 6a, 6b. Thus, when the carpet seam tape 5 is secured by the clamping means of the tape dispenser 10 and moved through the juxtaposed edges 7a, 7b of the adjacent carpet sections 6a, 6b the carpet tape 5 is directionally dispensed substantially centered below the juxtaposed edges 7a, 7b of the carpet sections 6a, 6b.

In operation, a roll of tape 31 is rotatably mounted on spindle 33 within the tape holder means 30 to dispense the tape 5 with the adhesive-carrying surface facing upward. The clamping means of the tape dispenser 10 engage and secure the carpet seam tape 5. The guide means of the tape dispenser 10 is then positioned between upward juxtaposed edges 7a, 7b of the adjacent carpet sections 6a, 6b to be seamed (see FIG. 3). The dispenser 10 is then moved between and substantially parallel to the juxtaposed edges 7a, 7b of the adjacent carpet sections 6a, 6b dispensing the carpet seam tape 5 substantially centered below the juxtaposed edges 7a, 7b of the adjacent carpet sections 6a, 6b.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A carpet seam tape apparatus for dispensing carpet seam tape, from a stationary axis rotatable roll thereof, below and centered with respect to juxtaposed edges of adjacent carpet sections, comprising
    a base having a forward portion and a rearward portion, and further having a top surface and a bottom surface, said base including a handle extending from said top surface said top surface and said bottom surface being substantially smooth to minimize the friction coefficient thereof;
    guide means connected to said base adapted for mounting between upturned juxtaposed edges of adjacent carpet sections to be seamed for guiding said base between and substantially parallel to the adjacent carpet sections, said guide means having a configuration to maintain displacement of said juxtaposed edges of adjacent carpet sections when disposed therebetween at substantially less than the width of the carpet seam tape; and clamping means connected to said base at said rearward portion thereof adapted to engage and align the carpet seam tape substantially centered between the juxtaposed edges of the adjacent carpet sections, said clamping means having a holding force sufficient to result in withdrawal of tape from the roll as said base is moved between said carpet sections.

2. The tape apparatus of claim 1 wherein said base comprises a thin substantially planar elongated member.

3. The tape apparatus of claim 1 wherein the vertical axis of said handle is aligned substantially parallel with the longitudinal axis of the carpet seam tape.

4. The tape apparatus of claim 1 including tape holder means for rotatably supporting the roll of the carpet seam tape.

5. The tape apparatus of claim 4 wherein said tape holder means includes a tape discharge passage adapted to directionally dispense carpet seam tape.

6. The tape apparatus of claim 4 wherein the roll of tape has an axis of rotation which is generally perpendicular to the juxtaposed edges of the adjacent carpet sections to be joined.

* * * * *